Jan. 6, 1970    M. L. KULMAN    3,487,901
CLUTCH

Filed Dec. 11, 1967    2 Sheets-Sheet 1

INVENTOR.
MELVIN L. KULMAN
BY
Bernard J. Murphy
AGENT

United States Patent Office 3,487,901
Patented Jan. 6, 1970

3,487,901
CLUTCH
Melvin L. Kulman, Sayre, Pa., assignor to Ingersoll-Rand Company, New York, N.Y., a corporation of New Jersey
Filed Dec. 11, 1967, Ser. No. 689,584
Int. Cl. F16d 43/20, 25/063; B23q 5/00
U.S. Cl. 192—56                18 Claims

ABSTRACT OF THE DISCLOSURE

A fluid-operated, torque-responsive clutch having two variable volume chambers, and fluid-supplying passageways freely communicating, alternately, with one or the other of the chambers, to cause the fluid-filled chambers to move a clutch jaw to engage the clutch, or to hold it in disengagement; and having a fluid-venting, i.e. bleed-off, and spring arrangement to release the fluid from the chambers automatically to free the clutch from the fluid-held disengagement.

DISCLOSURE

This invention pertains to clutches but in particular to clutches used primarily in fluid-actuating tools such as screwdrivers and the like.

Pressure-fluid-operated, torque-responsive clutches are known in the prior art. They comprise angular-faced jaws which engage, under fluid pressure to transmit torque therethrough and disengage under conditions of maximum torque, the fluid pressure then being operative to hold the jaws in disengagement. However, the known fluid-operated clutches require manual operation of the throttle to halt the driving member, and to dissipate the fluid pressure which holds the jaws in disengagement. Again, so as to be able to use the clutch again, to engage the jaws, it is then necessary to again operate the throttle control to effect reengagement. Further, the known pneumatic clutches have the jaws normally held in engagement by a pneumatic force assisted by a spring. In operation, then, the jaw-engaging means in the condition of maximum torque, must overcome that which can be a set and constant fluid force, but also that which is rarely a constant spring bias. Spring fatigue, and the inherent inconstancy of the biasing force thereof, militates against a precisely-determined torqueing limit for such known clutches. Finally, the known pneumatic clutches employ valving which necessarily rotates rapidly with the clutch jaws, inviting excessive wear of the sealing means carried by, or adjacent to, the valving. Therefore, it is an object of this invention to provide a clutch of the type cited using only fluid force for positively holding the clutch jaws in disengagement.

Another object of this invention is to provide a clutch employing only fluid force to effect disengagement thereof. Another object of this invention is to teach a clutch having means for holding the clutch jaws thereof in disengagement, at a given full measure of displacement therebetween, which means become operative automatically in response to a displacement of said jaws which is less than said full measure to rapidly establish said given full measure.

Another object of this invention is to provide a clutch having means which automatically attenuate the means which hold the clutch jaws in disengagement, to enable subsequent re-engagement of the jaws.

Another object of this invention is to provide a clutch capable of communicating a controlled torque, the control being readily accessible to the operator, thereby rendering the tool with which the clutch can be associated applicable, for instance, for setting screws or the like of different sizes without requiring the use of tools of different capacities.

Yet another object of this invention is to provide a clutch having means coacting with the jaws thereof to effect and hold relative displacement therebetween, which exhibit but one, non-rotational mode of movement.

A feature of this invention resides in the provisioning of two variable volume chambers in communication with the fluid supply, the one chamber being used to hold the jaws positively in engagement, and the other chamber being used to hold the jaws positively in disengagement.

Another feature of this invention is the provisioning of a small passageway communicating said other chamber with the ambient atmosphere automatically to vent i.e. bleed-off, the fluid therefrom. Another feature of this invention resides in the use of a dual valve which admits fluid first to the fluid operated clutch to assure engagement of the jaws before admitting fluid to the driving motor. Further objects and features of this invention will become more apparent by reference to the following description taken in conjunction with the accompanying figures in which.

Figure 1:
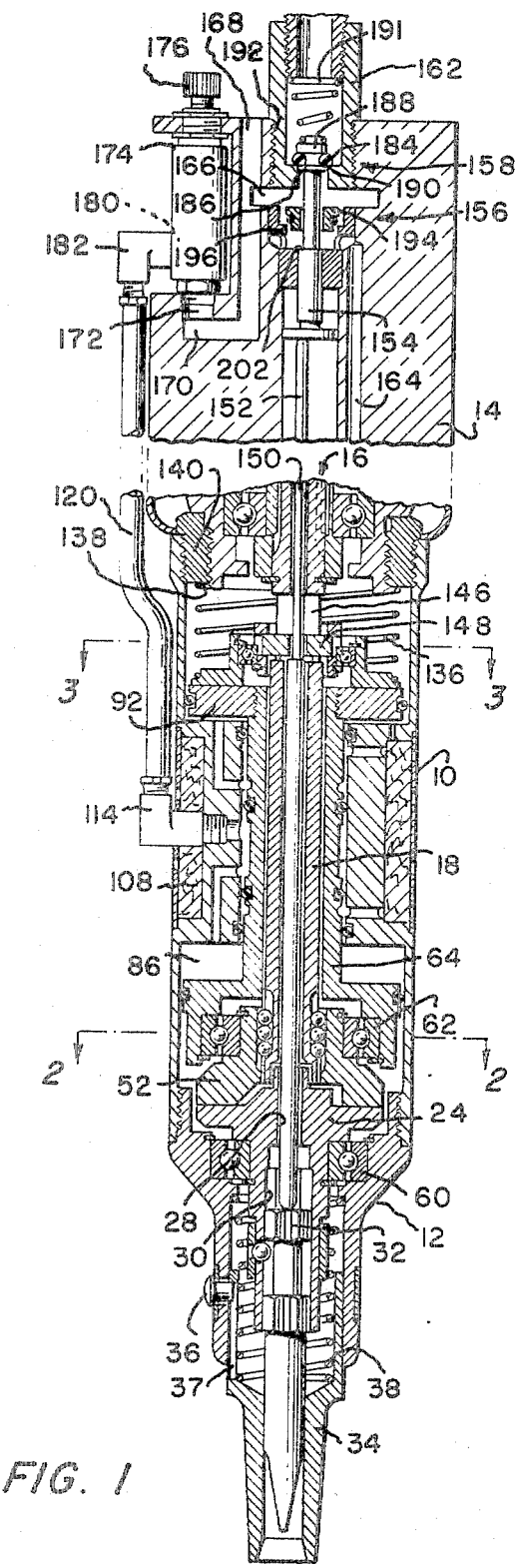
FIGURE 1 is a partial cross-sectional view of a fluid-operated tool employing a clutch according to the invention excluding a fluid motor and gear train, taken along the axial center thereof.
Figure 4:
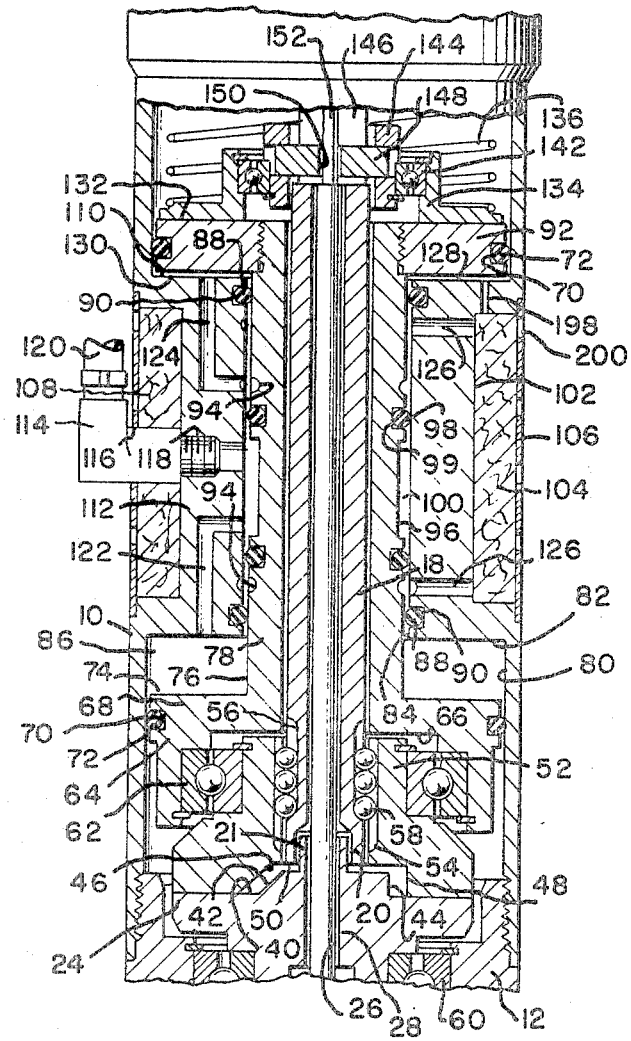
FIGURE 4 is an abstraction of an intermediate portion of the cross-sectional view of FIG. 1.

Referring now to FIGURES 1 and 4, the fluid-operated tool, which incorporates the clutch according to my invention, has a housing 10 of generally cylindrical shape with a chuck adapter section 12 at one end thereof and a motor adapter section 14 coupled to the opposite end thereof. In the ensuing discussion, the use of the term "forward" or "forwardly" will signify the area toward section 12; "readward" or "rearwardly" will signify the end opposite. Index numeral 16 indicates generally a spline-drive coupling through which drive shaft 18 is driven by means of a geared air motor or the like (not shown). Details of the motor and power transmission are omitted from the drawing, as these are well understood in the field and the arrangement thereof has no pertinency to the instant invention.

The forward end of drive shaft 18 carries a circular socket 20 in which is received a circular stub 21 which projects centrally from a first jaw member 24. The stub 21 and its mating socket 20 serve locating purposes. The first jaw member 24 has an axial bore 26 to receive a push rod, of which more will be explained subsequently. Axial bore 26 has a first circular cross section 28 and a larger hexagonal cross section 30, the latter being provided to receive the hexagonal end 32 of the shank of a tool such as a screwdriver bit as illustrated. Housing 10 also incorporates a screw finder sleeve 34 slidably held in the chuck adapter section 12 by means of a pin 36 held in section 12 the end of which is received in a longitudinal slot 37 formed in the wall of sleeve 34. Sleeve 34 is urged outwardly by means of spring 38.

Figure 2:
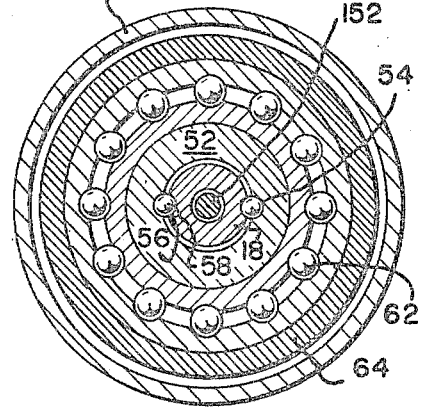
FIGURE 2 is a cross-sectional view of the ball-and-trough drive-through arrangement, taken along section 2—2 of FIG. 1.

First jaw member 24 has a rearwardly disposed face 40 which has formed on the surface thereof acute and obtuse angular surfaces 42 and right angular surfaces 44. Said surfaces are provided for complementary mating with acute and obtuse angular surfaces 46 and right angular surfaces 48 formed on the proximate and forwardly disposed face 50 of a second jaw member 52. Member 52 has formed therein and centrally thereof a plurality of radially arranged troughs 54 extending axially with respect to the drive shaft 18 which are semi-circular in cross-section. Interfacing therewith is a complementary plurality of troughs 56 of similar configuration, also axially extending, formed in drive shaft 18. Disposed between troughs 54 and 56 are sets of balls 58 to carry rotation therethrough. This ball-and-trough drive-through configuration is more clearly shown in FIG. 2. Troughs 54 and 56 are axially offset. That is, as shown in (FIG. 1), both are of equal length, yet trough 56 extends rearward further than does trough 54, and the latter projects forwardly more than does trough 56. This arrangement facilitates a continuance of through driving while member 52, under torqueing-resistance response, translates axially and rearwardly. In the axial translation thereof, member 52 causes the sets of balls 58 to roll rearwardly, relative trough 56, while maintaining communication of rotational torque from shaft 18 to member 52.

A bearing 60 supports the first jaw member 24 for rotation within the chuck adapter section 12. Bearing 60 is retained on a forwardly extending shank of member 24, and within a recess provided therefor in section 12, by retaining rings. A second bearing 62 supports the second jaw member for rotation in and relative to a follower 64. Thus, follower 64 is not rotatable. Follower 64 is a generally spool-shaped member having on the forward end thereof a cup-shaped recess 66. Recess 66 is formed in the first radial end 68 of the spool-shaped follower 64 to retain therein bearing 62 about the outer race thereof; a rearwardly-extending shoulder formed of jaw member 52 receives the bearing inner race. Retaining rings hold the bearing 62 in place.

The first radial end 68 has formed in the outer periphery thereof a circumferential groove 70 which receives an O-ring seal 72. The rearwardly disposed face 74 of radial end 68 cooperates with a portion 76 of the intermediate shank 78, a first, larger inside diameter 80 of housing 10, a forward face 82 defined by the radial surface joining the larger inside diameter 80, and a second, smaller, inside diameter 84 of housing 10, to form a first variable volume chamber 86. An O-ring seal 88 is seated in a circumferential groove 90 formed in the smaller inside diameter 84 to seal one end of chamber 86. Seal 72 closes the other end of the chamber 86.

The second, rearward radial end 92 of follower 64 also has a groove 70 and an O-ring seal 72 disposed therein for sealing between the periphery thereof and a continuation of inside diameter 80 of housing 10. A pair of spaced, shallow circumferential grooves 94 formed in shank 78 of follower 64, equi-distant from the radial ends 68 and 92, and semi-circular in cross-section, are provided for purposes of fluid-venting which will be explained subsequently. Additionally, a wide-girth, externally-relieved, annular area 96 is formed in the shank 78 of follower 64 centrally of grooves 94. O-ring seals 98 are disposed adjacent opposite ends of said area 96, in grooves 99 provided therefor, about shank 78. Grooves 99 are formed, interpositionally, between grooves 94 and relieved area 96. O-ring seals 98 close area 96 from areas therebeyond axially of shank 78, and cooperate with the smaller inside diameter 84 of housing 10 to form an annular space 100.

A broad, externally-relieved, annular area 102 is formed in housing 10 which holds damping material 104, the material being enclosed by a cover 106. The damping material 104, and the area 102 in which it is placed provides a muffler chamber 108.

A rearwardly disposed face 110 defined by the inner radial surface of the housing 10 which joins diameters 80 and 84, corresponds to face 82 at the forward end of the housing. Faces 110 and 82 define therebetween the axial extent of inside diameter 84, and thereby define the limits of an annular channel block section 112 formed thereby.

A threaded tubing adapter 114 is mounted through a hole 116 formed in cover 106 of the muffler chamber.

Hole 106 is continuous with a partially tapped hole 118, formed in channel block section 112. For purposes to be explained subsequently, adapter 114 is provided to communicate fluid to annular space 100. Tubing 120 carries the fluid from a source to adapter 114. Forward and rearward right angle channels 122 and 124 are formed in the channel block section 112 to communicate space 100 with faces 82 and 110. Also, linear radial channels 126 are formed in the channel block section 112, near the ends thereof, for venting purposes as will be explained subsequently.

A second variable volume chamber 128 is formed of forwardly disposed face 130 of the second radial end 92, the rearward continuation of diameter 80, follower shank 78, and the rearward face 110 of channel block section 112. Second, rearward O-ring seals 72 and 88 close off chamber 128.

Figure 3:
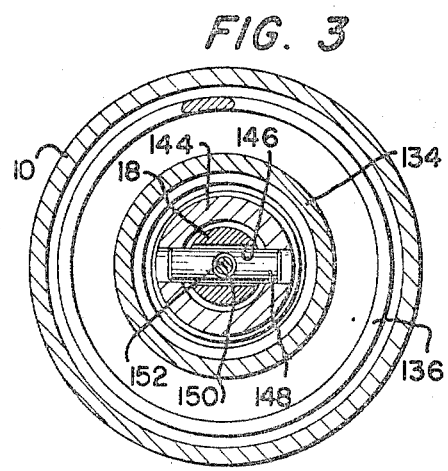
FIGURE 3 is a cross-sectional view of a pin and spring-loaded cap arrangement, taken along section 3—3 of FIG. 1.

Rearwardly disposed face 132 of radial end 92 receives a flanged sleeve 134 which is constrained thereagainst by a spring 136. Spring 136 is disposed between the flange of the sleeve 134 and a shoulder 138 formed of a coupling ring 140. Coupling ring 140 is a structural member to which motor adapter section 14 is fixed and which is threadably coupled to housing 10. Flanged sleeve 134 carries a bearing 142, centrally thereof, to effect relative rotation between the flanged sleeve and a centrally bored pin holder 144 disposed about drive shaft 18 and carried by a portion of the inner race of bearing 142. Drive shaft 18 has an axially extending slot 146 formed in a portion thereof through which a pin 148 is disposed. The ends of pin 148 extend beyond shaft 18 and are received in the pin holder 144 and retained therein by another portion of the inner race of bearing 142. FIGURE 3 presents a cross-sectional view of this pin/holder arrangement.

Axial bore 26 formed in first jaw member 24 is continued rearwardly through second jaw member 52 and through shaft 18 as far as this axially-extending slot 146; thereafter a smaller diameter axial bore 150 cooperates with axial bore 26 to carry a push rod 152. Push rod 152 has two diameters slightly smaller than, but complementing those of bores 150 and 26. Pin 148 also has formed therein the smaller axial bore 150, and forwardly thereof a shoulder formed on the push rod 152 by the juncture of the two diameters thereof, abuts the rim of bore 150 in pin 148.

The rearward end of the push rod abuts a plunger 154. Plunger 154 is operative of two valves, motor fluid valve 156 and clutch fluid valve 158. Both valves 156 and 158 and the plunger 154 are carried in a valve block-fluid inlet rearward termination of motor adapter section 14. A fluid inlet adapter 162 provides porting through which fluid from a source (not shown) can be introduced to the tool. Conduitry 164 provides means for passing the fluid to the motor for operation thereof. Conduitry 166, 168 and 170 provide means for conducting the fluid to a pressure regulator inlet 172. The pressure regulator 174 carries an external control 176 by means of which the amount of fluid communicated to chamber 100 can be controlled. The regulator outlet 180 receives a tubing adapter 182 which is joined to tubing 120.

Valve 158 comprises a valving member 184, carried by, but constrained against movement relative plunger 154 by shoulders 186 and 188 formed on said plunger, and a valve seat 190. Spring 191 disposed against shoulder 188 urges the plunger 154 forwardly, to close both valves. Valve seat 190 is an inwardly-extending shoulder formed in inlet adapter 162, the latter being threaded into a tapped bore 192 in the rearward termination of section 14.

Valve 156 comprises a valving member 194 carried by and disposed for limited movement relative plunger 154, and a valve seat 196; seat 196 is an additional inwardly extending shoulder formed in inlet adapter 162. Member 194 is disposed for limited movement slidably along plunger 154 in response to fluid from inlet adapter 162 and translations of plunger 154 is caused by push rod 152. Valve 156 controls the flow of fluid to the fluid motor and valve 158 controls the flow to chamber 100.

Finally, it is to be noted that a small diameter passageway 198 formed axially in channel block section 112 continuously communicates second variable volume chamber 128 with muffler chamber 108. A plurality of exhaust ports 200 are formed in the muffler chamber cover 106. Also, plunger 154 carries a radial shoulder 202 thereon forward of member 194.

The novel structure of my invention comprises the forward and rearward right angle channels 122 and 124 which alternately communicate the fluid to either the first or the second variable volume chambers 86 or 128, respectively. Also the dual valving of the fluid supply, it is to be noted, in having a fixed valve member 184 and a slidable member 194, admits fluid to chamber 100 just before admitting fluid to the motor, whereby it is assured that the clutch jaws will be in engaged disposition before the motor is enabled.

In operation, the tool is addressed to a machine screw or the like work for torquing thereof and this in turn causes the bit end of the tool or implement to translate the push rod 152 rearwardly against the plunger 154. Accordingly, fluid first is admitted past valve 158 through conduitry 166, 168, and 170 to the regulator 174 and from thence to chamber 100 by means of tubing 120. Valve member 194 tends to unseat and open valve 156, with the movement of plunger 154, but fluid impinging thereon causes it to remain seated until the radial shoulder 202 formed on plunger 154 is carried into abutting relationship with member 194. At that time, valve 156 is opened and fluid is admitted to the motor. In the disposition of my clutch as illustrated in FIGURE 1, the first variable volume chamber 86 is in communication with the fluid by virtue of the fact that bore 118 communicates with chamber 100 and the latter, by means of right angle channel 122, communicates with chamber 86. The fluid force bearing against face 74 of the radial end 68 of the follower 64 causes the second jaw member 52 to engage the first jaw member 24.

Eventually the resistance of the workpiece will become greater than the ability of the force of the fluid to hold the jaw members in engagement. At this time, the angular surfaces 42 and 46 of jaw members 24 and 52 will exhibit a relative sliding motion therebetween causing second jaw member 52 to disengage from jaw member 24. Movement of jaw member 52 carries therewith follower 64. Accordingly, variable volume chamber 86 is constricted and the fluid therein is pressured thereby. Eventually the follower 64 will travel a given distance when the fluid will be vented from chamber 86. Note that at this time forward seal 98 will have passed the radial leg of channel 122, thereby interdicting the communication of fluid with the first variable volume chamber 86. Meanwhile the rearward seal 98 will have opened the way for communication of right angle channel 124 with the second variable volume chamber 128. Therefore, chamber 128 now will receive the fluid. The force of the fluid now bearing against face 130 will carry follower 74 fully rearward.

Subsequently the axially formed passageway 198 vents i.e. bleeds off, the fluid in the second variable volume chamber 128. The fluid is evacuated through passageway 198 via muffler chamber 108 and the exhaust ports 200 formed in the cover 106.

As long as the operator holds the tool against the workpiece, variable volume chamber 128 continues to hold the jaws positively in disengagement. This is so because passageway 198 cannot bleed off fluid as fast as tubing 120 is supplying it. Yet, when the tool is withdrawn from the workpiece, supply of fluid to chamber 100 stops, and passageway 198 can evacuate chamber 128. When the tool is no longer torqueing the workpiece, the operator removes it therefrom.

Gradually then, but automatically, the ability of the fluid force in second variable volume chamber 128 to hold the clutch in disengaged disposition is attenuated by the bleeding off of the fluid therein through the muffler chamber. Thus, due to the bias of spring 136 the follower 64 is eventually carried forward again to constrict the volume of variable volume chamber 128. Subsequently, rearward seal 98 will pass to a position forward of right angular channel 124 sealing second variable volume chamber 128 from the source of fluid. Then, the bias of spring 136 will cooperate with rearward radial channel 126 and passageway 198 to evacuate chamber 128. With full evacuation of chamber 128, the tool will be returned to the disposition shown in FIG. 1.

When the workpiece is being addressed, and when as a consequence thereof follower 64 has travelled rearwardly the full displacement distance, forward radial channel 126 will proceed to communicate with right-angle channel 122. This communication is provided for by grooves 94 and an annular exhaust space which lies between O-ring seals 98 and 88; it will immediately vent the first variable volume chamber 86 through the muffler chamber 108. Until this venting is possible, the gradual constriction of chamber 86 pressures the fluid therein. The facility with which chamber 86 can be constricted depends upon the setting of the external control 176 of regulator 174.

As the venting of chamber 86 proceeds, the expansion of chamber 128 follows therefrom. Follower 64, in travelling the full rearward distance constricts the volume of chamber 86, hastening the exhaust of fluid therefrom, and increases the volume of chamber 128. Chamber 128 freely expands, under the force of the fluid, because the bias of spring 136 has been removed therefrom. The address of the tool to the workpiece causes the rearward translation of push rod 152. This translation, through the abutting relationship of the shoulder in the push rod with the rim of bore 150 in pin 148, moves the pin, pin holder 144, bearing 142 and flanged sleeve 134 rearwardly. This action compresses spring 136, un-biasing chamber 128. In turn then, when full torque of the workpiece is achieved, chamber 128 expands to full volume in the manner just described.

It is to be noted that, upon withdrawal of the tool from the workpiece, valve 156 will close just prior to valve 158. Thus, as a safety feature, the motor will be halted before fluid communication with chamber 100 is interdicted.

It is the teaching of my invention, then, to provide a clutch employing but fluid force to move the jaws thereof into disengagement, and only fluid force for positively holding said jaws in disengagement. Further, my invention teaches the employment of but fluid force actuation by means which automatically attenuate the "positive holding" of the disengagement and, with withdrawal of the tool from the workpiece, automatically dispose the jaws for successive re-engagement. The fluid-force means, according to my disclosure, further becomes automatically and fully effective to cause said jaws' full relative displacement in response to a torque-resistance-induced lesser displacement.

I claim:

1. A clutch, for use in fluid-motor-powered tools, comprising:

a housing;

interfacing clutch jaws arranged in said housing, said jaws being disposed for mutual engagement to transmit torque therebetween;

said jaws having interfacing, angularly-relieved surfaces to effect relative displacement between, and disengagement of, said jaws when torque transmitted therebetween reaches a predetermined maximum;

first means supplying fluid to said housing to cause said fluid to hold said jaws positively in said disengagement; and second means for attenuating the ability of said first means to hold said jaws in disengagement, said second means being automatically operative, in response to said disengagement of said jaws, to bleed off fluid from said housing to facilitate an automatic re-engagement of said jaws.

2. A clutch, according to claim 1, wherein: said first means further supply fluid to said housing to cause said fluid to hold said jaws positively in engagement.

3. A clutch, according to claim 1, wherein: said first means are automatically operative, in response to a given degree of said relative displacement, rapidly to effect full displacement and disengagement, of said jaws.

4. A clutch, according to claim 1, wherein: said first means comprise means coupled to one of said jaws to coact therewith, said coupled means being cooperative with said housing to define variable volume chamber means within said housing for receiving and confining fluid; and passageway means formed in said housing for communicating fluid to said chamber means;

said jaws' relative coupling means being responsive to said displacement to pressure fluid confined by said chamber means.

5. A clutch, according to claim 4, wherein: said coupled means comprise a follower rotatably coupled to said one jaw.

6. A clutch, according to claim 4, wherein: said second means comprise channeling formed in said housing communicating said variable volume chamber means with the ambient atmosphere.

7. A clutch, according to claim 4, wherein: said coupled means, in coacting with said one jaw, exhibits but one, non-rotational mode of motion.

8. A clutch, according to claim 1, wherein: said first means comprise a generally spool-shaped follower rotatably coupled to one of said jaws to coact therewith, said follower having first surfaces and second surfaces, said first surfaces cooperative with surfaces of said housing to define variable volume chamber means within said housing for receiving and confining fluid; and passageway means formed in said housing cooperative with said second surfaces of said follower for communicating fluid to said chamber means;

said follower, movably responsive coincident with jaws' relative said displacement, causes surfaces thereof to pressure fluid confined by said chamber means.

9. A clutch, according to claim 8, wherein: said variable volume chamber means comprise a plurality of variable volume chambers; and said passageway means comprise a first channel, one end of which opens on one chamber of said plurality, and the other end, with engagement of said jaws, is sealed from said second surfaces, and with disengagement of said jaws, said other end is in communication with said second surfaces.

10. A clutch, according to claim 9, wherein: said follower carries means adjacent opposite terminuses of said second surfaces to seal said other end from said second surfaces.

11. A clutch, according to claim 10, wherein: said follower, movable in response to said displacement, moves said seal means past said other end to effect communication of said other end with said second surfaces.

12. A clutch, according to claim 9, wherein: said follower, movable in response to said displacement, causes the volume of one chamber of said plurality to be reduced and the volume of another chamber thereof to be increased.

13. A clutch, according to claim 9, wherein: said passageway means further comprise a second channel, one end of which opens on one chamber of said plurality and the other end, with engagement of said jaws, is in communication with said second surfaces, and with disengagement of said jaws, said other end is sealed from said second surfaces.

14. A clutch, according to claim 1, wherein: said first means further comprise valving means for controlling the supply of fluid to the housing and to a motor-supply conduit.

15. A clutch, according to claim 14, wherein: said valving means, upon withdrawal of said tool from a workpiece, automatically interdicts fluid supply first to said conduit and subsequently to said housing.

16. A clutch, according to claim 14, wherein: said valving means, upon address of said tool to a workpiece, automatically supplies fluid first to said housing and subsequently to said conduit.

17. A clutch, according to claim 16, wherein said valving means comprise:

a push-rod movably disposed within said housing;

a valve plunger resiliently urged into contact with said push-rod; and a plurality of valving members carried by said plunger, one of said valving members being fixed, and another of said valving members being slidably disposed, relative to said plunger.

18. A clutch, according to claim 6, wherein said first means further include:

means interposed between said valving means and said housing to regulate the supply of fluid to said housing.

References Cited

UNITED STATES PATENTS 2,683,512   7/1954   Boice.
3,205,986   9/1965   Kramer _____ 192—150 XR MARK M. NEWMAN, Primary Examiner ALLAN D. HERRMANN, Assistant Examiner U.S. Cl. X.R.

91—59; 173—12; 192—86